Aug. 16, 1966  H. O. CORBETT  3,266,093
APPARATUS FOR PRODUCING LAMINATED PRODUCTS
Filed Sept. 14 1964  2 Sheets-Sheet 2

HERBERT O. CORBETT
INVENTOR.

BY E. J. Berry

United States Patent Office 3,266,093
Patented August 16, 1966

3,266,093
APPARATUS FOR PRODUCING LAMINATED PRODUCTS
Herbert O. Corbett, Bridgeport, Conn., assignor to National Distillers and Chemical Corporation, New York, N.Y., a corporation of Virginia
Filed Sept. 14, 1964, Ser. No. 396,436
5 Claims. (Cl. 18—14)

This invention relates to a novel extrusion apparatus for extruding laminated film products, and is a continuation-in-part application of copending application Serial No. 350,220, filed March 9, 1964, entitled Laminated Products, and Methods and Apparatus for Producing Same, and assigned to the assignee of the present invention.

When extruding laminated film of the type described in the above noted application, each of the flow channels of the die structure is commonly connected to a respective extruder device. There are many applications, however, where the same film composition is desired to be formed in laminated sheets or tubes or, in the case of a product having more than two laminates, it may be desirable to use the same film material for the inner and outer film laminates.

The present invention provides a novel arrangement for connecting an extruder to the extrusion die, whereby a central flow channel is connected directly to the output of the extruder after the control valve member of the extruder while an auxiliary channel is connected from the extruder in front of its control valve and directly to an outer flow channel in the die. Thus, only a single extruder is needed for supplying at least two or more separate flow channels of the laminating die.

By using this novel dual flow path from a single extruder to different flow channels of an extrusion die, it also becomes possible to use independently controlled heaters for independently controlling the melt temperatures of the materials introduced into the channels of the extrusion die. Therefore, various orientation properties of the film can be easily controlled with the properties of the same film on the internal layer of the laminate being different than those of the same film product in the other of the layers.

Accordingly, a primary object of this invention is to provide a novel extrusion apparatus wherein a single extruder feeds a plurality of channels in a laminating extrusion die.

Another object of this invention is to provide a first and second output channel from an extruder device which are respectively before and after the control valve of the extruder.

A further object of this invention is to provide a novel extrusion apparatus for producing laminated film wherein at least two of the film layers are of the same film material.

Yet another object of this invention is to provide a novel extrusion apparatus for laminated film wherein two of the laminates of the film are of identical material, but have different properties.

These and other objects of the invention will become apparent from the following description when taken in connection with the drawings, in which.

Figure 1:
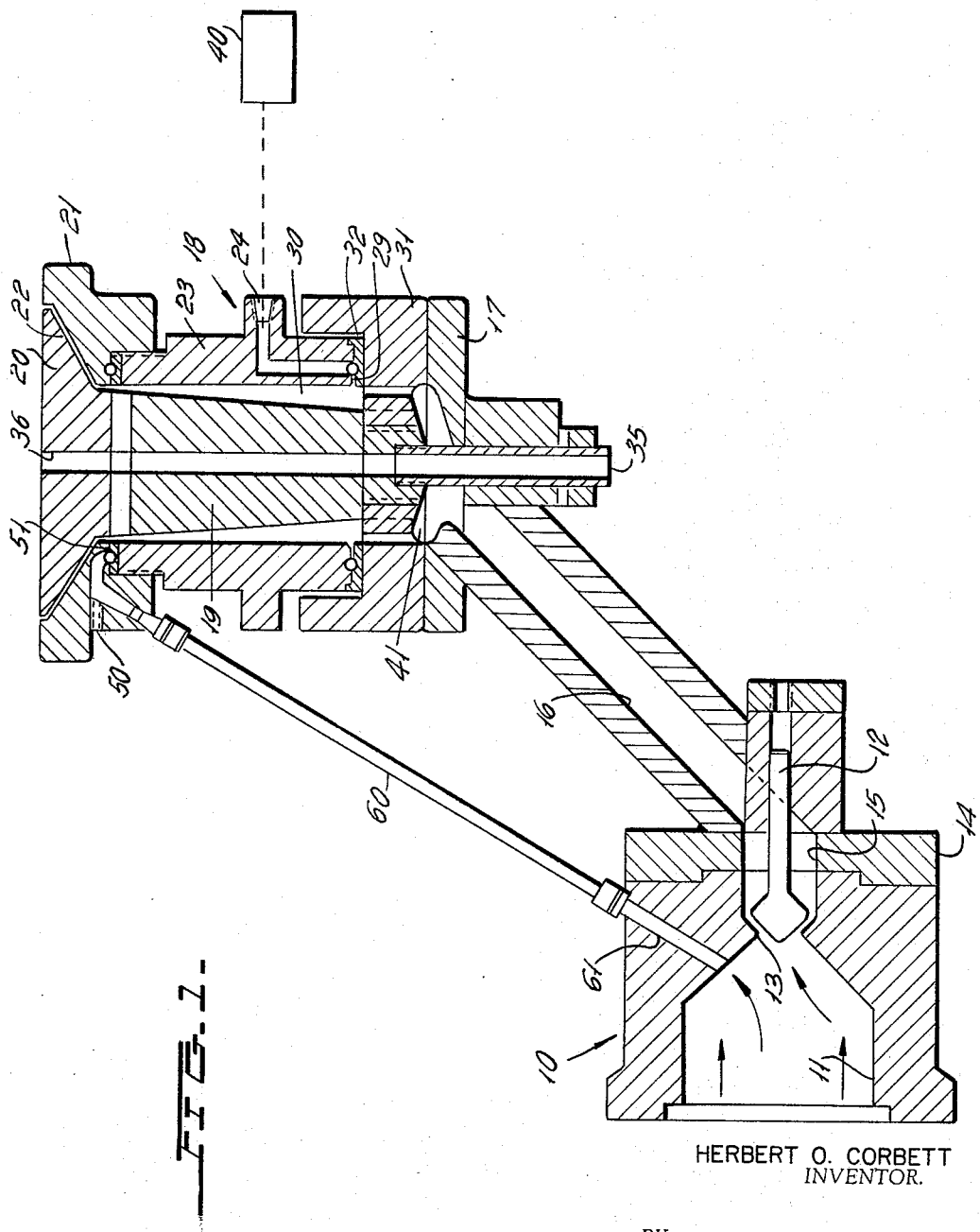
FIGURE 1 shows a cross-sectional view of a first embodiment of the invention.

Referring first to FIGURE 1 and incorporating by reference herein the disclosure of the above noted copending application Serial No. 350,220, I have specifically illustrated the invention for use with a circular extrusion die. Clearly, however, the invention is equally applicable to a straight die lip structure.

The extruder section 10 is of the well-known type, and is connected to a means for forcing a plastic melt into the channel 11. A valve member 12 which is adjustably positioned with respect to a valve seat 13 is carried in the adapter plate 14 which, for example, threadably receives valve 12. The channel 11 then communicates with channel 15 and conduit 16 which is connected to mounting plate 17 of the laminating extrusion die 18.

The extrusion die 18 is of the type set forth in the above noted copending application, and includes a mandril section 19 which terminates on a circular outlet orifice lip 20 which cooperates with an outer orifice lip 21. The lips 20 and 21 define a conical discharge orifice 22 through which a tube of laminated plastic film is drawn into a suitable apparatus of a well-known variety. Note that tube 35 communicating with channel 36 in mandril 19 defines an air channel for introducing air into the plastic film tube drawn from orifice 22.

The lip or disk 21 is then carried on a main support body 23 which has an inlet conduit 24 which terminates in a circular discharge orifice 29 which lays adjacent the exterior of the main flow channel 30.

The orifice 29 can, for example, be formed between body 23 and the disk-shaped plate 31 which has an orifice-defining disk 32 seated on the top thereof.

The conduit 24, as illustrated in dotted lines, is then connected to its own respective extruder 40. Conduit 16 of the extruder is then connected to chamber 41 which communicates directly with flow channel 30 in the manner described in the above noted copending application. Thus, material from extruder 10 flows up the conduit 16 under pressure into the flow channel 30 and upwardly to the discharge orifice 22. At the same time, the material from extruder 40 is caused to overlie and be laminated to the outer surface of the tube moving up channel 30 so that the extruded tube leaving discharge orifice 22 will be formed of the laminated products coming from extruders 10 and 40, respectively.

The above noted application also describes the use of a still further input channel for communicating with the main flow path 30. More specifically, an input flow channel 50 could be provided in accordance with the teachings of the above noted application, which communicates with a discharge orifice 51 which again surrounds the flow path 30. Therefore, if another source of molten film product is connected to channel 50, it is clear that the tubular product leaving orifice 22 will be formed of a three-ply laminate with the material from conduit 16 being the innermost ply, the material from orifice 29 being the intermediate laminate, and the material from orifice 51 being the outermost laminate.

In accordance with the present invention, conduit 50 is directly connected to auxiliary conduit 60 which is connected to channel 61 leading to channel 11 of extruder 10 which is in front of valve 12. Therefore, the outer and inner film laminates of the extruded product will be of the same film material when using the apparatus of the present invention. Note that this eliminates the need for a third extruder for forming a particular laminated film product.

Moreover, independently controlled heaters (not shown) may now control the melt temperatures of the materials flowing in channels 16 and 60 so that the various orientation properties of the film laminates produced from these respective channels can be easily controlled.

Also, the single control valve 12 will now control the distribution of pressure between conduits 16 and 60 so that a desired laminate thickness for each of the laminates can be obtained by this single control means.

Figure 2:
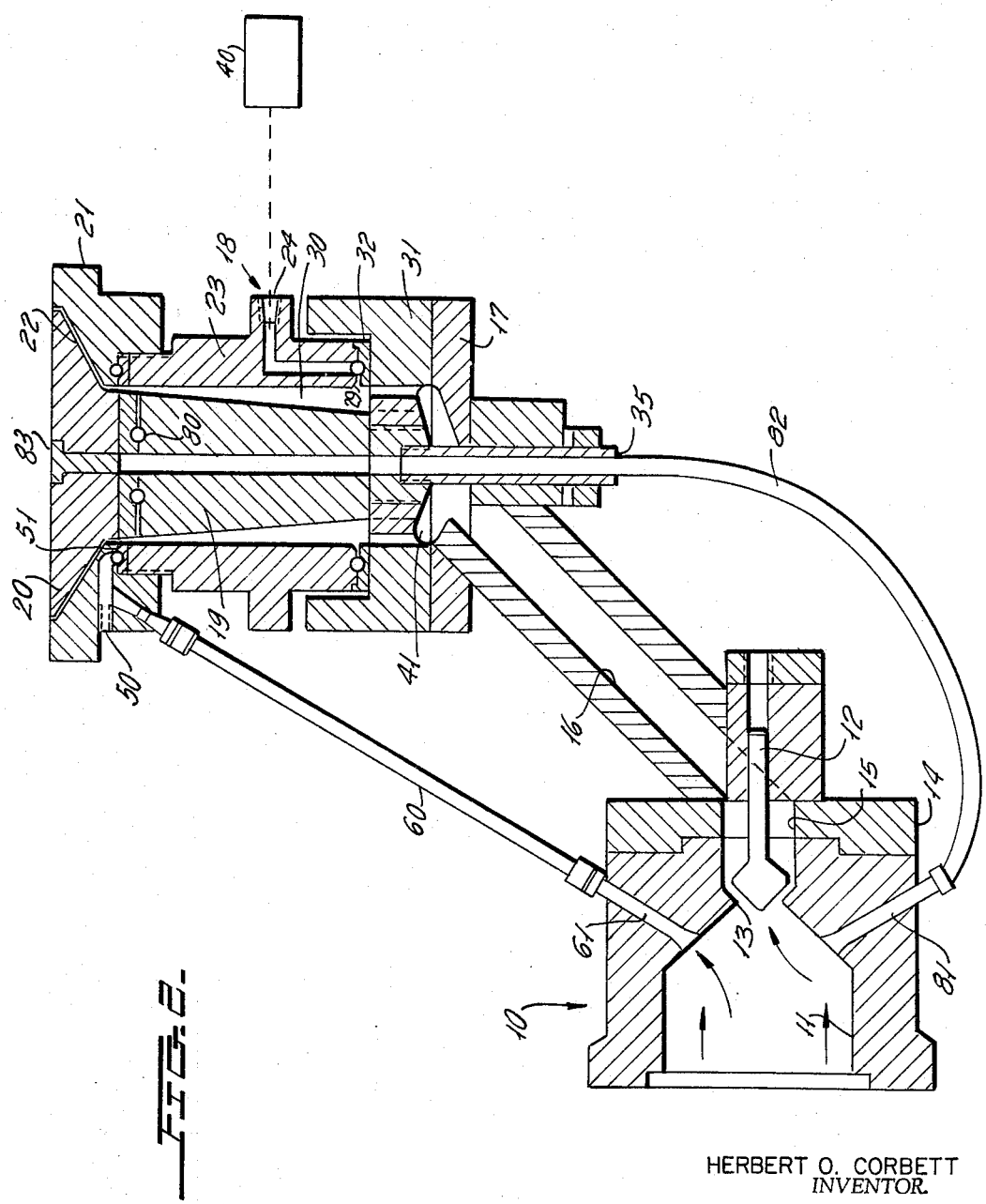
FIGURE 2 shows a second embodiment of the invention wherein additional channels are connected to the extrusion die from in front of the valve structure.

Referring next to FIGURE 2, I have illustrated therein a second embodiment of the invention wherein components similar to those of FIGURE 1 have been given similar identifying numerals. FIGURE 2 first illustrates the manner in which an additional channel 80 can be added into the die and connected to a suitable extruder for providing an additional and inner layer to the tube being extruded.

In addition, FIGURE 2 illustrates the manner in which an additional channel 81 can be formed in body 10 in front of valve 12 and connected to auxiliary conduit 82. The auxiliary conduit 82 is then connected to the central channel for tube 35 formerly used to supply air for inflating the tube. With this arrangement, the channel 35 may be suitably connected to orifice 80 with the uppermost central opening in the die air channel closed off by a suitable plug 83.

With the structure of FIGURE 2, and assuming that extruder 40 is inoperative, a three-ply tube may be drawn of the same material having, however, different melt characteristics desired which is formed of a central body comprised of the material coming through conduit 16, an outermost body or layer composed of the material in auxiliary conduit 60 and an innermost layer comprised of the material coming from auxiliary conduit 82.

It is noted that the formerly used air conduit has been sealed off by the plug 83. Therefore, in order to inflate the tube drawn from the die outlet opening 22, other techniques well known to those skilled in the art are used wherein air is injected into the tube as by a hypodermic needle or syringe which a skilled operator moves upwardly with the movement of the tube, and at the same time injecting air. This air is then trapped between an overhead pair of nip rolls (not shown) and the upper surface of the die body in the usual manner to keep the tube inflated during operation.

Although this invention has been described with respect to its preferred embodiments, many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An extrusion apparatus for extruding laminated film products; said extrusion apparatus including an extruder and an extrusion die connected to said extruder; said extrusion die defining a flow path for fluid products and having a die outlet section, said extruder having a control valve therein and a first and second outlet conduit; said first and second outlet conduits extending from said extruder at a location in front of and behind said control valve, respectively; and first and second channels in said extrusion die; said first and second flow channels extending into said flow path; said first and second flow channels being connected to said first and second outlet conduits, respectively.

2. The apparatus substantially as set forth in claim 1 which includes a third flow channel extending into said flow path and a second extruder connected to said third flow channel; said third flow channel being disposed between said first and second flow channels.

3. An extrusion apparatus comprising an extruder and an extrusion die; said extruder including an outlet conduit having a control valve therein, and a first and second outlet conduits connected to said extruder conduit, respectively, in front of and behind said control valve; said extrusion die including a first flow channel, a second flow channel and a common discharge outlet section; said first and second flow channels having a first input end and extending into said common discharge outlet section; said input ends of said first and second flow channels being connected to said first and second outlet conduits, respectively.

4. The apparatus of claim 3 which further includes a third flow channel interposed between said first and second flow channels, and a second extruder; said third flow channel having an input end connected to said second extruder and terminating in said common discharge outlet section.

5. The apparatus of claim 3 wherein said first, second and third flow channels are tubular in cross-section and are concentric with one another.

References Cited by the Examiner
UNITED STATES PATENTS

| | | | |
|---|---|---|---|
| 2,317,687 | 4/1943 | Larchar | 18—14 X |
| 2,688,154 | 9/1954 | Huckfeldt | 18—14 |
| 2,871,516 | 2/1959 | Sherman et al. | 18—12 X |
| 3,029,471 | 4/1962 | Adams et al. | 18—12 X |
| 3,193,878 | 7/1965 | Corbett | 18—14 |

FOREIGN PATENTS

| | | |
|---|---|---|
| 692,496 | 8/1964 | Canada. |

WILLIAM J. STEPHENSON, *Primary Examiner.*

UNITED STATES PATENT OFFICE
CERTIFICATE OF CORRECTION

Patent No. 3,266,093            Dated August 16, 1966

Inventor(s) Herbert O. Corbett

It is certified that error appears in the above-identified patent and that said Letters Patent are hereby corrected as shown below:

The first two paragraphs of the patent should read as follows:

This invention relates to a novel extrusion apparatus for extruding laminated film products.

When extruding laminated film, where the same film composition is desired to be formed in laminated sheets or tubes or, in the case of a product having more than two laminates, it may be desirable to use the same film material for the inner and outer film laminates.

Signed and sealed this 19th day of September 1972.

(SEAL)
Attest:

EDWARD M. FLETCHER, JR.　　　　　　　　ROBERT GOTTSCHALK
Attesting Officer　　　　　　　　　　　　Commissioner of Patents